United States Patent
Langkjær et al.

(10) Patent No.: US 6,173,614 B1
(45) Date of Patent: Jan. 16, 2001

(54) METHOD AND DEVICE FOR MEASURING THE HEIGHT OF THE CUTTING TABLE

(75) Inventors: Carsten Langkjær, Herlev; Jens Arne Hald, Randers, both of (DK)

(73) Assignee: Dronningborg Industries A/S, Randers (DK)

( * ) Notice: Under 35 U.S.C. 154(b), the term of this patent shall be extended for 0 days.

(21) Appl. No.: 09/117,562

(22) PCT Filed: Jan. 29, 1997

(86) PCT No.: PCT/DK97/00039

§ 371 Date: Jul. 28, 1998

§ 102(e) Date: Jul. 28, 1998

(87) PCT Pub. No.: WO97/28461

PCT Pub. Date: Aug. 7, 1997

(30) Foreign Application Priority Data

Jan. 30, 1996 (DK) .................................................. 0098/96

(51) Int. Cl.[7] .................................................. G01B 15/00
(52) U.S. Cl. .................................................. 73/627
(58) Field of Search .................................................. 73/570, 579, 587, 73/613, 618, 627, 641, 663, 597, 602; 56/10.2 R; 367/99, 100

(56) References Cited

U.S. PATENT DOCUMENTS

| | | | |
|---|---|---|---|
| 4,738,137 | * 4/1988 | Sugg et al. | 73/587 |
| 4,910,717 | * 3/1990 | Terry | 367/99 |
| 5,060,205 | 10/1991 | Phelan . | |
| 5,155,983 | * 10/1992 | Sheehan et al. | 56/10.2 |
| 5,365,442 | * 11/1994 | Schmidt | 364/424.07 |
| 5,714,687 | * 2/1998 | Dunegan | 73/587 |

FOREIGN PATENT DOCUMENTS 0 511 768 A2   4/1992   (EP) .

* cited by examiner

Primary Examiner—Hezron Williams
Assistant Examiner—Rose M. Miller
(74) Attorney, Agent, or Firm—Darby & Darby

(57) ABSTRACT

A method for measuring the height of the cutting table of an earth-processing implement or an agricultural implement, such as, for example, a combine harvester, relative to a surface of a ground having crops by means of an acoustic transducer arrangement. The method includes forming the sound signal emitted by the transducer arrangement by a pseudonoise signal covering a predetermined frequency band. Comparing the sound signal with the reflected signal. Mutually delaying the sound signal and the reflected signal until the comparison has reached its optimum. Whereafter, the delay represents a measurement of the distance to the surface of the ground.

8 Claims, 3 Drawing Sheets

METHOD AND DEVICE FOR MEASURING THE HEIGHT OF THE CUTTING TABLE

TECHNICAL FIELD

The invention relates to a method of measuring the height of the cutting table of an earth processing implement, such as an agricultural implement, relative to a surface of the ground with crops by means of an acoustic transducer arrangement.

BACKGROUND ART

German Offenlegungsschrift No. 4,324,766 discloses a measuring of the height of a cutting table of for instance a combine harvester by means of ultrasound. This known measuring method is encumbered with the draw-back that possible crops on the surface of the ground can cause undesired reflections and attenuation, which to a considerable degree makes the measuring difficult.

BRIEF DESCRIPTION OF THE INVENTION

The object of the invention is to provide a method of measuring the height of a cutting table by means of a sound signal, where the method is not encumbered with the above draw-backs.

A method of the above type is according to the invention characterised in that the sound signal emitted by the transducer arrangement is of a particular character or follows a particular pattern and is preferably a pseudonoise signal covering a predetermined frequency band, said sound signal being compared with the reflected signal in such a manner that said signals are mutually delayed until the comparison has reached an optimum, whereafter the delay represents a measurement of the distance to the surface of the ground.

This comparing technique involves only a measurement of the signals deriving from the reflection from the surface of the ground, whereby it is utilized that the signals received present a pattern identical with the pattern of the transmitted signals. In this manner the picking up of even weak signals has been facilitated, whether these signals are weak or not compared to interference signals.

According to the invention it is possible, if desired, to perform a mathematical filtration of the pseudonoise signal.

The pseudonoise signal can furthermore according to the invention be weighted so as to achieve a uniform energy density across the desired bandwidth.

According to a particularly advantageous embodiment of the invention an array of optionally phase-controlled transducers is used as transmitters. As a result, it is furthermore possible to utilize the data found in the phases for achieving a more accurate measuring of the height than hitherto known.

As an alternative, it is possible to use an array of acoustic transducers as receivers.

According to a particularly advantageous embodiment of the invention the comparison is performed by the correlation coefficient being measured between the signals to be compared, said signals being mutually delayed until said correlation coefficient has reached its maximum.

Moreover, it is according to the invention possible to perform a simultaneous measuring between a transmitter and a plurality of receivers, said measuring signals being analyzed individually before they are evaluated and combined so as to provide the final measuring result. In this manner it is possible to compensate for one or more irrelevant elements, such as stones, interfering with one or more of the transmission paths.

Finally, it is according to the invention possible to alternate between various pseudonoise signals.

The invention relates also to a device for carrying out the method according to the invention for measuring the height of the cutting table of an agricultural implement relative to a surface of the ground with crops by means of an acoustic transducer or a transducer arrangement. The sound signal emitted by the transducer or the transducer arrangement presents according to the invention a characteristic pattern which can be easily distinguished from irrelevant signals. The resulting measuring device is particularly simple.

BRIEF DESCRIPTION OF THE DRAWING

The invention is explained in greater detail below with reference to the accompanying drawing, in which.

BEST MODE FOR CARRYING OUT THE INVENTION

Figure 1:
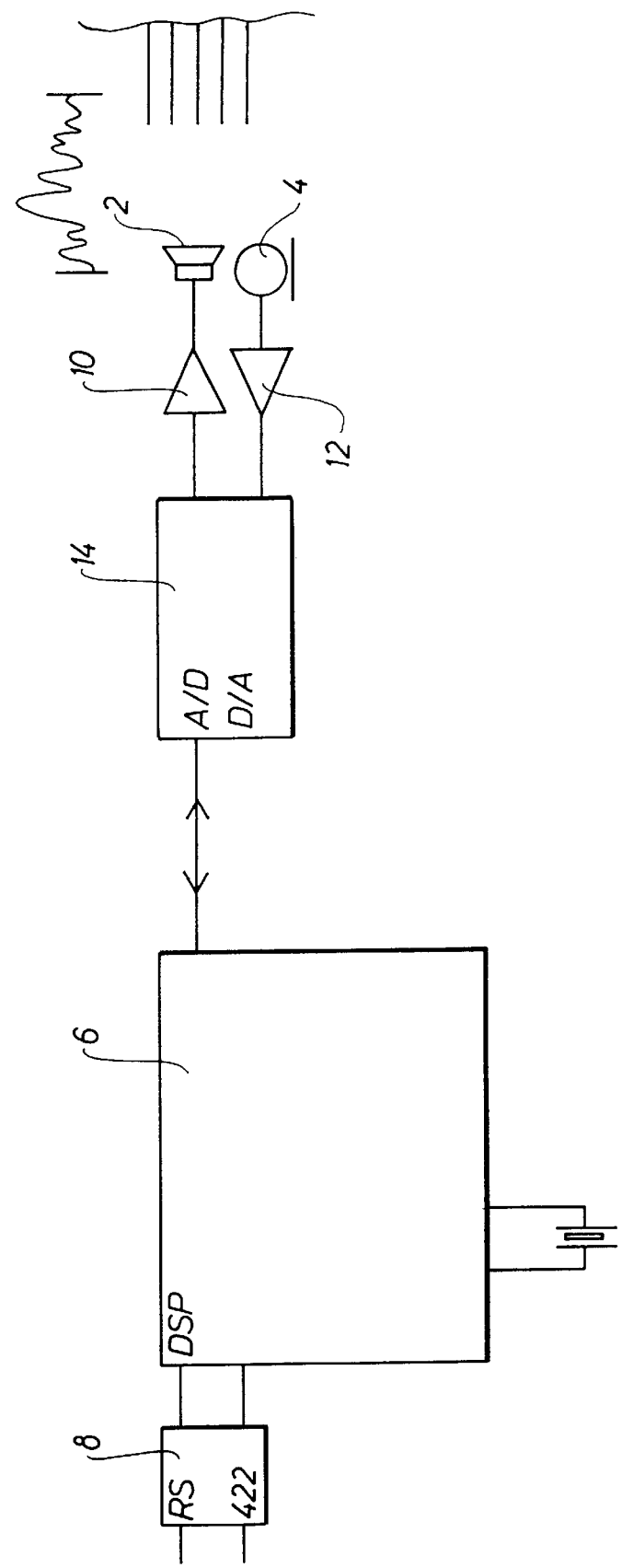
FIG. 1 illustrates a measuring system for measuring the operating height, such as the height of the cutting table of an agricultural implement, such as a combine harvester, by means of an acoustic signal.

The measuring system shown in FIG. 1 for measuring the operating height, such as the height of the cutting table of an earth processing device or an agricultural implement relative to the surface of the ground with crops comprises a microprocessor 6. The microprocessor 6 communicates with a D/A- and A/D-converter 14, which in turn communicates with a loudspeaker 2 and a microphone 4 arranged at the cutting table and being directed towards the surface of the ground. A sound signal emitted by the loudspeaker 2 is reflected from the surface of the ground and received by the microphone 4. The time delay between the emission and the reception represents then a measurement of the distance to the surface of the ground, the distance to the surface of the ground corresponding to half the time delay multiplied with the velocity of the sound in the air.

The microprocessor 6 is formed by a DSP (digital signal processor) with a register structure and a set of instructions suited in the present situation. The microprocessor 6 communicates with the control computer of the combine harvester through a bus 8 in form of an RS-422. As a result, it is possible to read programs into the microprocessor 6 via the control computer, which for instance can be a personal computer.

The signals to be emitted as sound signals are loaded in form of digitized signals into a memory associated with the microprocessor 6 in form of a RAM. The sound signals must meet predetermined requirements which are rather inconsistent. In order to obtain the best possible time delay and consequently the best possible determination of the distance, the frequency must be as high as possible. It must, however, at the same time be possible to receive a distinct echo from the surface of the ground, which is far from being an ideal plane reflector, and consequently the frequency must not be too high. In addition, irrelevant reflections from crops on the surface of the ground must not be able to interfere with the measuring.

When a sound signal in form of a unit pulse is used, energy is in principle emitted across the entire frequency area. The majority of this energy is, however, found within the sensitive area of the microphone 4. Energy is, however, lost in the frequency area within which the loudspeaker 2 is able to emit. The energy reflected towards the microphone 4 is therefore strongly reduced. Accordingly, it is not so simple to provide a suitable signal.

The signal emitted by the loudspeaker is according to the invention of a particular character because it can for instance be pulse code modulated and follow a particular pattern which is easy to recognize.

Figure 2:
FIG. 2 shows an example of a signal in form of a pseudonoise signal covering a predetermined frequency band.
Figure 3:
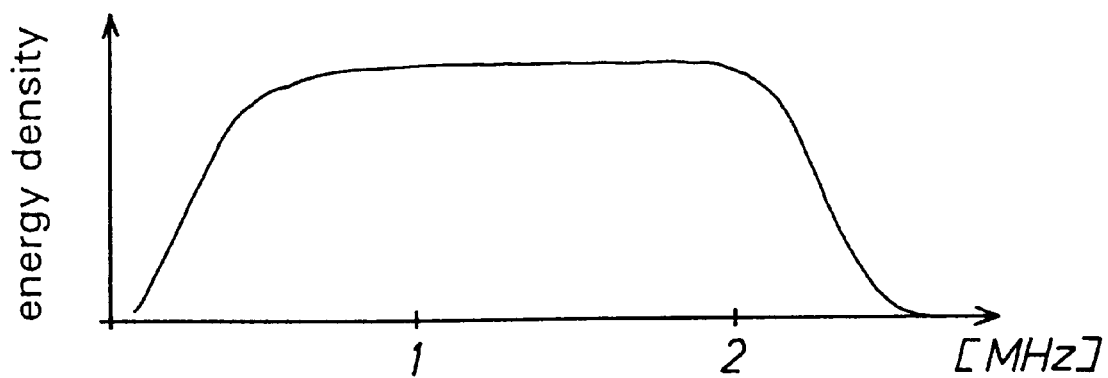
FIG. 3 illustrates the frequency band of the pseudonoise signal.

According to a particularly advantageous embodiment, a so-called pseudonoise signal is used, cf. FIG. 2, the pseudonoise signal being mathematically filtered. After the filtration, the signal is weighted such that a uniform energy density is obtained across the desired bandwidth, cf. FIG. 3, from which it appears that the bandwidth is of a few MHz. Coincidence must apply to both phase and amplitude. This measuring signal is loaded in form of a digitized code into the RAM memory of DSP and is used during the reception for calculating the delay of the received signal. 128 samplings are involved of the transmitted and the received signal, respectively. The measuring signal is converted into analogous form in a so-called CODEC, for instance of the type AD-1849. Beyond performing a compression of data, this CODEC can also be used in connection with linear A/D-and D/A-converters 14 of 16 bit. One of these D/A-converters is used for generating the analogous measuring signal. After the level adjustment, the signal is transmitted to an output amplifier 10 for driving the loudspeaker 2.

As sound source it is possible to use an array of loudspeakers, such as two loudspeakers in form of dometweeters with a horn, the loudspeakers being coupled by twos in series to their respective output amplifiers. When an array of sound sources are used, the sources can optionally be phase-controlled.

An electret microphone 4 can for instance be used as the receiver. The microphone 4 is placed in the focal point of a parabolic reflector in order to obtain the highest possible directivity and a strong attenuation of a direct coupling from the loudspeaker 2. The microphone 4 communicates with a preamplifier 12.

The preamplifier must present a good signal-noise-ratio and can for instance be of the type PO213 with an amplification of approximately 100.

The A/D-conversion is also carried out in an A/D-1849. 16 bits are used in two channels. The sampling frequency is selected such that 256 samplings can be recorded during the period available from the transmission of a sound signal and until the echo is received. The conversion is initiated by means of DSP 6 after a suitable delay. This delay can be varied and adapted to the adjustment of the height of the cutting table of for instance a combine harvester.

The echo from the surface of the ground is filtered by means of a mathematical function depending on the transfer function of the microphone and the surroundings. The filtered signal is then cross-correlated with the stored signal from the time of the transmission. The position of the maximum value of this correlation provides the delay of the sound signal. However, this delay must be supplemented with the delay originally set before the receiving of data for the echo. This sum is multiplied with half the velocity of the sound in air and represents then an expression of the distance between the measuring system and the surface of the ground. When the measuring of the distance is too unreliable, such as when the noise level is very high, it is possible to improve the signal-noise-ratio by using an average of several succeeding measurements.

It is furthermore possible to switch between several differing pseudonoise signals.

Figure 4:
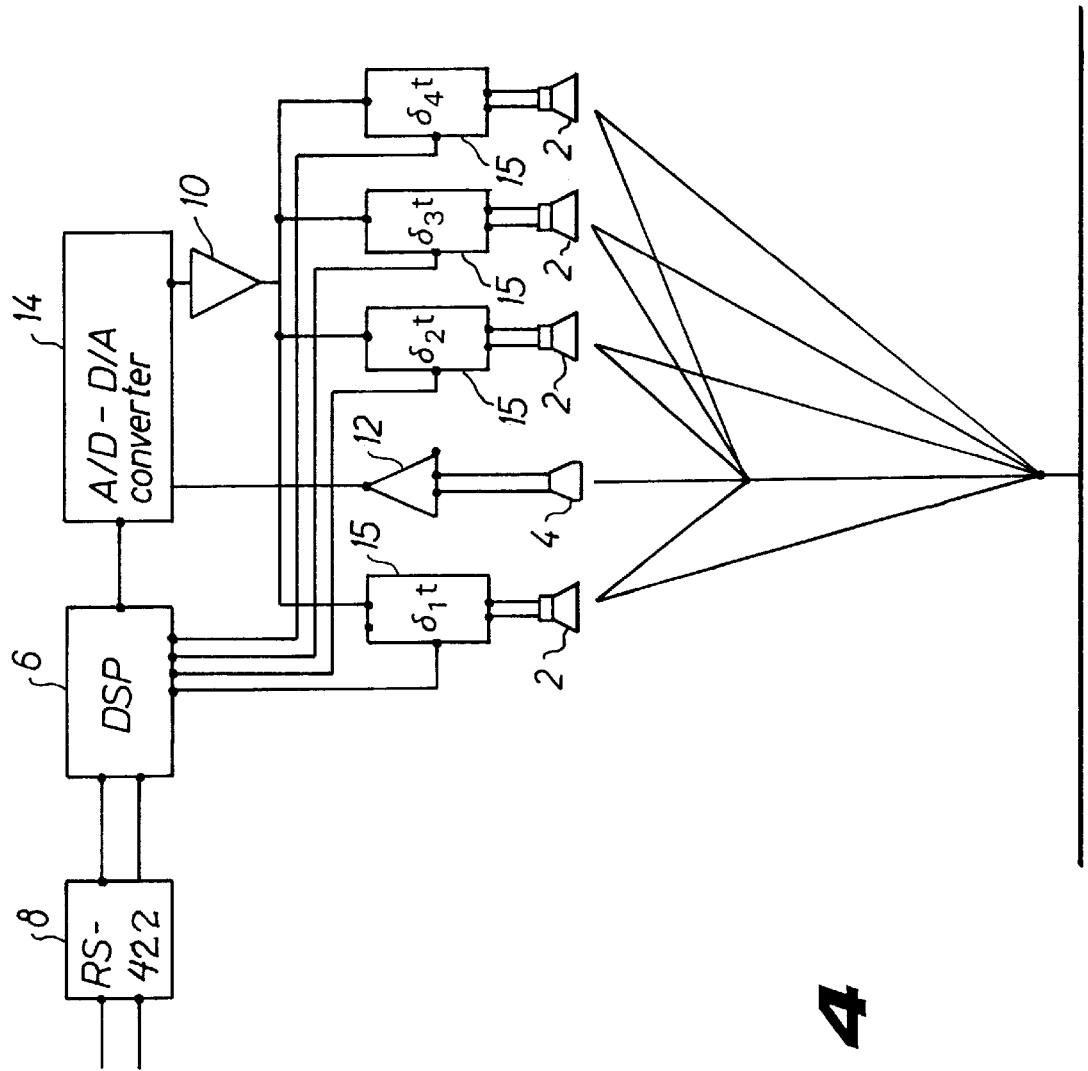
FIG. 4 shows an example of a transducer arrangement comprising an array of transmitter transducers and a receiver transducer.

FIG. 4 shows an embodiment of a transducer arrangement with an array of transmitter transducers and one receiver transducer. The electronic circuit corresponds substantially to the one shown in FIG. 1. A DSP 6 is shown, which communicates via a bus 8 with the control computer of the combine harvester. DSP 6 communicates with an A/D-D/A-converter controlling a plurality of loudspeakers through some delay links $\delta_1 t$, $\delta_2 t$, $\delta_3 t$ and $\delta_4 t$. The delays can be individually varied. Only one receiver is shown. The signal to the said loudspeakers is emitted by DSP. The signals emitted by the loudspeaker and reflected by the surface of the ground are received at the receiver 4. However, the varying of the delays renders is possible to focus on specific distances. The resulting advantage is that it is possible to perform a check at a specific expected depth and thereby to suppress irrelevant noise, such as noise from the cutting table, which is very noisy.

The illustrated embodiment comprises only one receiver. Nothing, however, prevents you from including several receivers.

Transducer arrangements with several transmitter transducers are, however, preferred because it is thereby possible to release the highest possible amount of sound energy and thereby to obtain the best possible signal-noise-ratio.

A transducer arrangement with several transmitter transducers and several receiver transducers is, however, also possible. The transmitter transducers in question must, however, be identical, and the receiver transducers in question must also be identical.

What is claimed is:

1. A method of measuring the height of the cutting table of an earth processing implement or an agricultural implement relative to a surface of the ground with crops by means of an acoustic transducer arrangement, said method comprising the steps of:

forming the sound signal emitted by the transducer arrangement by a pseudonoise signal covering a predetermined frequency band;

receiving a reflected signal;

correlating said sound signal with the reflected signal;

mutually delaying said sound signal and said reflected signal until the correlation has reached its maximum, whereafter the delay represents a measurement of the distance to the surface of the ground.

2. A method as claimed in claim 1, characterized in that the pseudonoise signal is subjected to a mathematical filtration.

3. A method as claimed in claim 1, characterized in that the pseudonoise signal is weighted to achieve a uniform energy density across the desired bandwidth.

4. A method as claimed in claim 1, characterized in that the correlation is carried out by a correlation coefficient being measured between the signals to be compared, said signals being mutually delayed until said correlation coefficient has reached its maximum.

5. A method as claimed in claim 1, further comprising the steps of measuring at the same time between a transmitter and a plurality of receivers to generate a plurality of individual measuring signals; evaluating and combining the individual measuring signals; and providing a final measuring result from the evaluation and combination of the individual measuring signals.

6. A method as claimed in claim 1 characterized in that it is possible to switch between various pseudonoise signals.

7. A device for measuring the height of the cutting table of an agricultural implement relative to the surface of the ground with an acoustic transducer arrangement, said device comprising:

- means for forming a sound signal emitted by the transducer arrangement by a pseudonoise signal covering a predetermined frequency band;
- means for receiving a reflected signal;
- means for correlating said sound signal with the reflected signal;
- means for mutually delaying said sound signal and said reflected signal until the correlation has reached its maximum, whereafter the delay represents a measurement of the distance to the surface of the ground.

8. A device as claimed in claim 7, characterized in that the signal emitted by the transducer is a pseudonoise signal of a predetermined bandwidth.

* * * * *